United States Patent
Kamijima

(10) Patent No.: US 9,383,782 B2
(45) Date of Patent: Jul. 5, 2016

(54) MOBILE TERMINAL, CONTROL METHOD THEREOF, AND PROGRAM

(71) Applicant: NEC CASIO Mobile Communications, Ltd., Kawasaki-shi, Kanagawa (JP)

(72) Inventor: Atsuhiko Kamijima, Kanagawa (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/429,037

(22) PCT Filed: Aug. 13, 2013

(86) PCT No.: PCT/JP2013/071858
§ 371 (c)(1),
(2) Date: Mar. 18, 2015

(87) PCT Pub. No.: WO2014/045765
PCT Pub. Date: Mar. 27, 2014

(65) Prior Publication Data
US 2015/0234436 A1    Aug. 20, 2015

(30) Foreign Application Priority Data
Sep. 19, 2012    (JP) .................................. 2012-205699

(51) Int. Cl.
*G06F 1/16* (2006.01)
*H04M 1/725* (2006.01)

(52) U.S. Cl.
CPC ......... *G06F 1/1694* (2013.01); *H04M 1/72519* (2013.01); *G06F 2200/1637* (2013.01)

(58) Field of Classification Search
CPC ......... G06F 1/1694; G06F 2200/1637; H04M 1/72519
See application file for complete search history.

(56) References Cited

U.S. PATENT DOCUMENTS

| | | | |
|---|---|---|---|
| 2005/0210417 A1* | 9/2005 | Marvit et al. | 715/863 |
| 2005/0212911 A1* | 9/2005 | Marvit et al. | 348/154 |
| 2009/0088204 A1* | 4/2009 | Culbert et al. | 455/556.1 |
| 2009/0262074 A1 | 10/2009 | Nasiri et al. | |
| 2009/0298533 A1* | 12/2009 | Alameh et al. | 455/556.1 |
| 2010/0289740 A1* | 11/2010 | Kim et al. | 345/157 |
| 2011/0148752 A1* | 6/2011 | Alameh et al. | 345/156 |
| 2011/0263329 A1* | 10/2011 | Miyazaki et al. | 463/36 |
| 2012/0218177 A1* | 8/2012 | Pang et al. | 345/156 |
| 2015/0079957 A1* | 3/2015 | De Leon | 455/414.1 |

FOREIGN PATENT DOCUMENTS

| | | |
|---|---|---|
| EP | 2189890 A2 | 5/2010 |
| JP | 3091787 U | 2/2003 |
| JP | 2006-333355 A | 12/2006 |

(Continued)

OTHER PUBLICATIONS

International Search Report for PCT Application No. PCT/JP2013/071858, mailed on Sep. 10, 2013.

(Continued)

*Primary Examiner* — Leon Flores

(57) ABSTRACT

A mobile terminal, including detection section 30 that detects an orientation and moving direction of mobile terminal 1; vibration section 40 that generate vibrations corresponding to the orientation and moving direction detected by detection section 30; and control section 50 that executes an operation of mobile terminal 1 corresponding to the orientation and moving direction detected by detection section 30.

6 Claims, 6 Drawing Sheets

(56) References Cited

FOREIGN PATENT DOCUMENTS

| | | |
|---|---|---|
| JP | 2007-051872 A | 3/2007 |
| JP | 2009-123105 A | 6/2009 |
| JP | 2010-034904 A | 2/2010 |
| JP | 2010-098356 A | 4/2010 |
| JP | 2010-118060 A | 5/2010 |
| JP | 2011-133416 A | 7/2011 |

OTHER PUBLICATIONS

EPO Search Report in corresponding EP patent application 13838966.3, dated May 3, 2016.

* cited by examiner

MOBILE TERMINAL, CONTROL METHOD THEREOF, AND PROGRAM

This application is a National Stage Entry of PCT/JP2013/071858 filed on Aug. 13, 2013, which claims priority from Japanese Patent Application 2012-205699 filed on Sep. 19, 2012, the contents of all of which are incorporated herein by reference, in their entirety.

TECHNICAL FIELD

The present invention relates to a mobile terminal, in particular, to a technique that allows the mobile terminal to execute an operation corresponding to its moving direction.

BACKGROUND ART

These days, mobile phones are becoming essential tools for our lives in terms of information exchange and information collection. When the mobile phones first appeared, most of them only had a telephone function. However, in recent years, like ordinary personal computers, the mobile phones can be used to transmit electronic mails and to access the Internet.

With a mobile terminal such as a mobile phone, the user generally operates it while watching information displayed on the display screen. Sometimes, if the user is reading a book, he or she might operate the mobile terminal without watching information displayed on the display screen.

Patent Literature 1 discloses a technique that detects the moving direction of a mobile terminal and executes an application corresponding to the detected moving direction. With this technique, the user can cause the mobile terminal to execute his or her desired application without need to watch information displayed on the display screen. In addition, this technique allows the mobile terminal to generate vibrations corresponding to the detected moving direction so as to allow the user to perceive an application that the mobile terminal starts to execute.

RELATED ART LITERATURE

Patent Literature

Patent Literature 1: JP2006-333355A

SUMMARY OF THE INVENTION

Problem to be Solved by the Invention

The technique disclosed in Patent Literature 1 allows a mobile terminal to execute an application corresponding to the detected moving direction of the mobile terminal and to generate vibrations corresponding to the detected moving direction. However, if the user performs such an operation without watching the mobile terminal, the mobile terminal may execute an application that the user does not desire depending on the orientation of the mobile terminal. For example, even if the mobile terminal is moved in the same direction, the detected moving direction of the mobile terminal, when the display section faces the user, will be opposite to the detected moving direction of the mobile terminal when the rear side of the mobile terminal faces the user. Thus, the mobile terminal executes an application that the user does not desire.

The present invention is made to solve the problem involved in the foregoing technique and to provide a mobile terminal, a control method thereof, and a program where the user allows the mobile terminal to execute his or her desired operation without it being necessary to watch information displayed on the display screen of the mobile terminal and can perceive its operation.

Means that Solve the Problem

To accomplish the foregoing object, the present invention is a mobile terminal, including:
  detection means that detects an orientation and moving direction of the mobile terminal;
  vibration means that generate vibrations corresponding to the orientation and moving direction detected by the detection means; and
  control means that executes an operation of the mobile terminal corresponding to the orientation and moving direction detected by the detection means.

In addition, the present invention is a mobile terminal, including:
  detection means that detects a moving direction of the mobile terminal;
  vibration means that generates vibrations corresponding to the moving direction detected by the detection means;
  control means that executes an operation of the mobile terminal corresponding to the moving direction detected by the detection means; and
  an enclosure that allows an orientation of the mobile terminal to be perceived by touching the mobile terminal.

In addition, the present invention is a control method for a mobile terminal, including:
  a detection process that detects an orientation and moving direction of the mobile terminal;
  a vibration process that generates vibrations corresponding to the orientation and moving direction detected in the detection process; and
  an operation execution process that executes an operation of the mobile terminal corresponding to the orientation and moving direction detected in the detection process.

In addition, the present invention is a program that causes a mobile terminal to execute the procedures, including:
  a detection procedure that detects an orientation and moving direction of the mobile terminal;
  a vibration procedure that generates vibrations corresponding to the orientation and moving direction detected in the detection procedure; and
  an operation execution procedure that executes an operation of the mobile terminal corresponding to the orientation and moving direction detected in the detection procedure.

Effect of the Invention

According to the present invention, the user can cause the mobile terminal to execute an operation he or she desires without it been necessary to watch the mobile terminal and can perceive its operation.

BEST MODES THAT CARRY OUT THE INVENTION

Next, with reference to the accompanying drawings, embodiments of the present invention will be described.

First Embodiment

Figure 1A:
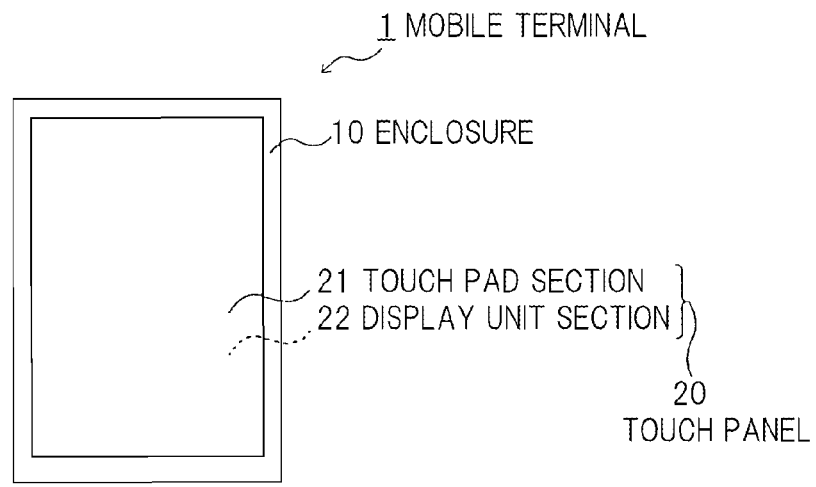
FIG. 1a is an external view showing a mobile terminal according to a first embodiment of the present invention.
Figure 1B:
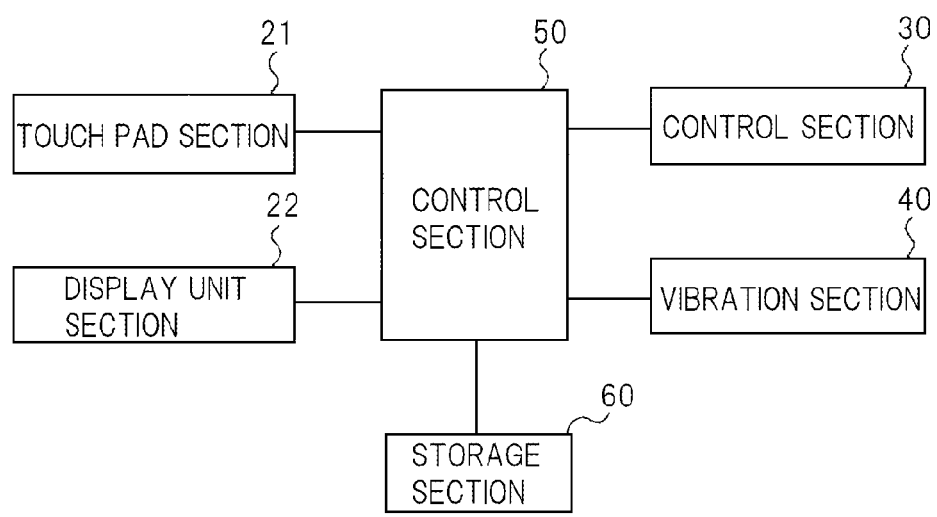
FIG. 1b is a functional block diagram showing the mobile terminal according to the first embodiment of the present invention.

FIG. 1a is an external view showing a mobile terminal according to a first embodiment of the present invention. FIG. 1b is a functional block diagram showing the mobile terminal according to the first embodiment of the present invention.

According to the first embodiment, as shown in FIG. 1a, touch panel 20 is located on the front of enclosure 10. Touch panel 20 is composed of display unit section 22 and touch pad section 21 that is placed thereon.

Enclosure 10 is composed of a front cover and a rear cover that are fit on their periphery and formed in a rectangular parallelepiped shape.

An electroconductive film (not shown) is formed on the front of touch pad section 21. When the user touches touch pad section 21 with his or her finger, since the static capacity between the electroconductive film and the finger varies, the position at which he or she touches the film is detected. Beside the static capacity type, a resistive film type may be used. Likewise, when the user touches the resistive film type touch panel section with his or her finger, two electroconductive films come into contact and the resistance of the position he or she touches varies. As a result, the position of the touch panel section at which the user touched the touch panel section with his or finger is detected.

Display unit section 22 is made of a liquid crystal, an organic EL, or the like. Display unit section 22 displays a screen necessary to perform an input operation on touch panel 20, an application that is being executed, a wallpaper, and so forth. The screen necessary to perform the input operation includes icons that indicate the applications that are being executed. By means of these icons, an application that is to be executed can be selected.

As shown in FIG. 1b, enclosure 10 houses detection section 30, vibration section 40, storage section 60, and control section 50.

Detection section 30 has an acceleration sensor and an azimuth sensor. With the acceleration sensor and the azimuth sensor, detection section 30 detects the orientation and the moving direction of mobile terminal 1.

Vibration section 40 can generate vibrations having a plurality of vibration patterns. Vibration section 40 generates vibrations corresponding to the orientation and moving direction detected by detection section 30.

In addition to storing a program that causes mobile terminal 1 to operate, storage section 60 stores data saved through a telephone directory function and a data holder function and programs and so forth of applications executed on mobile terminal 1.

Control section 50 controls the overall operation of mobile terminal 1. Using the program stored in storage section 60, control section 50 executes an application corresponding to the orientation and the moving direction of mobile terminal 1 detected by detection section 30. Specifically, if the application corresponding to the orientation and the moving direction of mobile terminal 1 detected by detection section 30 has not been started, control section 50 starts executing the application. If the application corresponding to the orientation and the moving direction of mobile terminal 1 detected by detection section 30 has been started and executed in the background, control section 50 implements the application.

In addition to the foregoing sections, enclosure 10 also houses a communication section that controls communication, an audio output section, an audio input section, and so forth. Since these sections exceed the scope of the present invention, their description will be omitted.

Next, a control method for mobile terminal 1 having the foregoing structure will be described.

Figure 2:
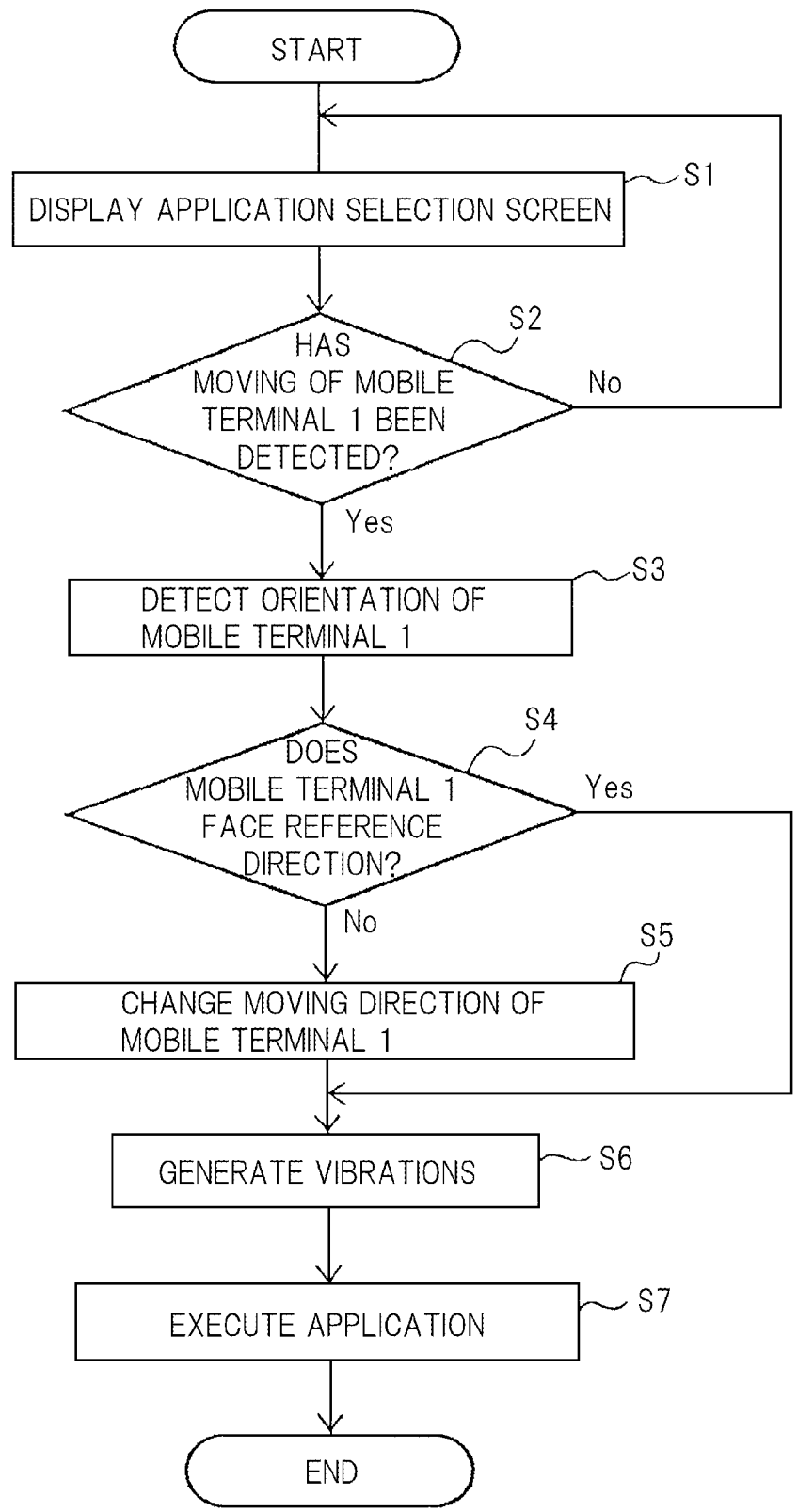
FIG. 2 is a flow chart describing a control method for the mobile terminal shown in FIG. 1a and FIG. 1b.

FIG. 2 is a flow chart describing a control method for mobile terminal 1 shown in FIG. 1a and FIG. 1b.

First of all, control section 50 causes display unit section 22 to display an application selection screen on touch panel 20 so that the user can select an application that can be executed on mobile terminal 1 (at step 1).

Figure 3:
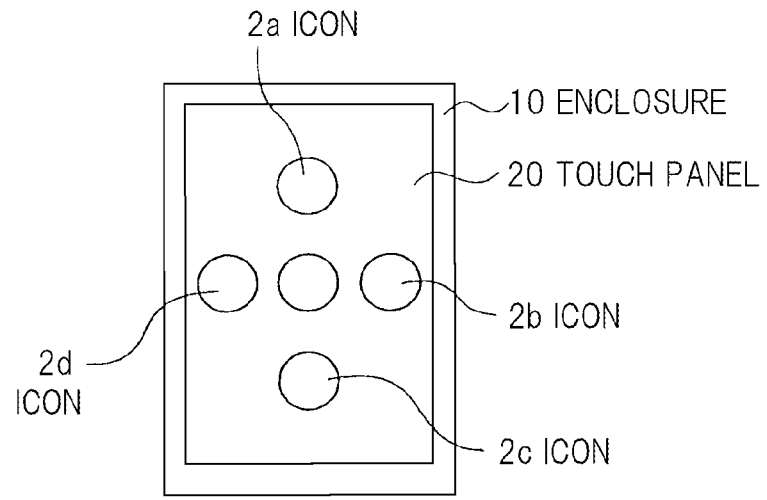
FIG. 3 is a schematic diagram showing an application selection screen displayed on a touch panel of the mobile terminal shown in FIG. 1a and FIG. 1b.

FIG. 3 is a schematic diagram showing the application selection screen displayed on touch panel 20 of mobile terminal 1 shown in FIG. 1a and FIG. 1b.

As shown in FIG. 3, the application selection screen displayed on touch panel 20 shows icons 2a to 2d that represent applications that can be executed on mobile terminal 1. Icons 2a to 2d represent different applications. When the user faces an operation side of mobile terminal 1, icon 2a is located on the top of mobile terminal 1. Icon 2b is located at the 3 o'clock position clockwise from icon 2a. Icon 2c is located at the 6 o'clock position. Icon 2d is located at the 9 o'clock position. When the user touches these icons 2a to 2d with his or her finger on touch panel 20, applications represented by icons 2a to 2d are executed. According to this embodiment, icons 2a to 2d are selected corresponding to the orientation and the moving direction of mobile terminal 1 and then applications represented by icons 2a to 2d are executed.

When the user shakes mobile terminal 1 in the direction corresponding to an application he or she desires, while the touch panel 20 is displaying the application selection screen, detection section 30 detects that mobile terminal 1 is moving (at step 2) and detects the orientation of mobile terminal 1 (at step 3). As a result, detection section 30 has detected the orientation and moving direction of mobile terminal 1.

If mobile terminal 1 detected by detection section 30 faces a reference direction (at step 4), vibration section 40 generates vibrations corresponding to the moving direction of mobile terminal 1 detected by detection section 30 (at step 6). The reference direction of mobile terminal 1 is the direction in which touch panel 20 faces obliquely upward, as the user operates mobile terminal 1, and icon 2a of icons 2a to 2d is located on the top of mobile terminal 1. Vibration section 40 generates vibrations that differ in vibration patterns depending on whether the moving direction of mobile terminal 1 is the up direction represented by icon 2a, the 3 o'clock direction represented by icon 2b, the 6 o'clock direction represented by icon 2c, or the 9 o'clock direction represented by icon 2d. Vibration section 40 may generate vibrations that differ in their patterns. Alternatively, vibration section 40 may generate vibrations that differ in the numbers of oscillations or the intensity of the oscillations.

In addition, control section 50 reads a program that starts an application corresponding to the moving direction of mobile terminal 1 detected by detection section 30 from storage section 60 and starts the corresponding application (at step 7). If the moving direction of mobile terminal 1 is the up direction represented by icon 2a, control section 50 starts the application represented by icon 2a. If the moving direction of mobile terminal 1 is the 3 o'clock direction, control section 50 starts the application represented by icon 2b. If the moving direction of mobile terminal 1 is the 6 o'clock direction, control section 50 starts the application represented by icon 2c. If the moving direction of mobile terminal 1 is the 9 o'clock direction, control section 50 starts the application represented by icon 2d. If the application corresponding to the moving direction of mobile terminal 1 is a mail application, while mobile terminal 1 is receiving an electronic mail and informing the user of the mail, control section 50 performs a read-out operation of the electronic mail with a sound.

If the user performs the foregoing operation without watching mobile terminal 1, mobile terminal 1 does not always face the foregoing reference direction. Thus, according to this embodiment, if the direction of mobile terminal 1 detected by detection section 30 is not the reference direction, control section 50 changes the moving direction of mobile terminal 1 corresponding to its orientation (at step 5). If the user remembers the positions of icons 2a to 2d shown in FIG. 3, he or she might shake mobile terminal 1 based on the positions of icons 2a to 2d although mobile terminal 1 does not face the reference direction.

FIGS. 4a to 4d are schematic diagrams showing the relationships between each of the positions of icons 2a to 2d corresponding to the orientations of mobile terminal 1 shown in FIG. 3.

Figure 4A:
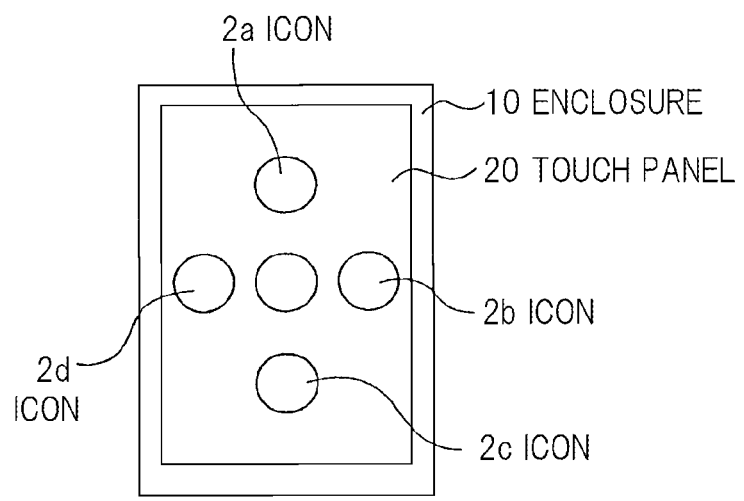
FIG. 4a is a schematic diagram showing the relationship between each of the positions of icons corresponding to the orientation of the mobile terminal shown in FIG. 3.
Figure 4B:
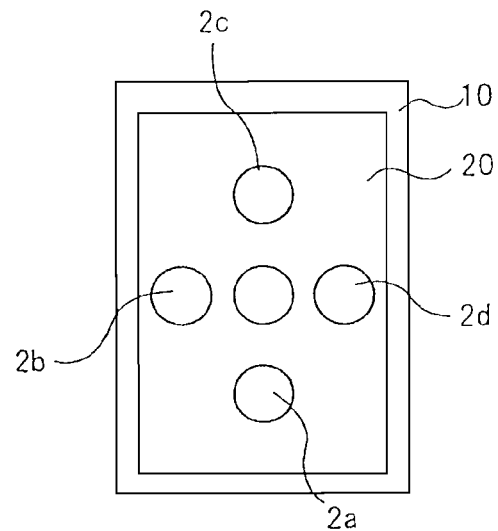
FIG. 4b is a schematic diagram showing the relationship between each of the positions of icons corresponding to the orientation of the mobile terminal shown in FIG. 3.
Figure 4C:
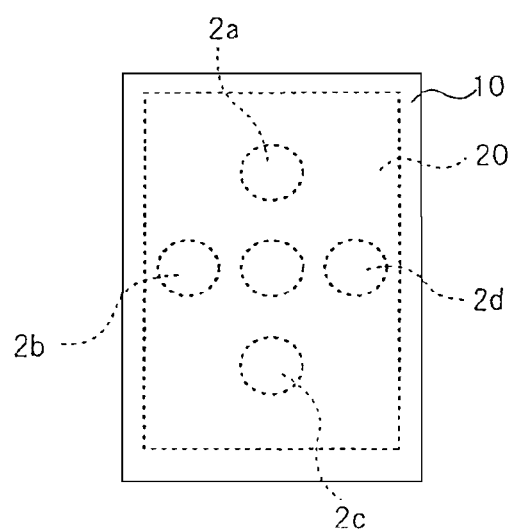
FIG. 4c is a schematic diagram showing the relationship between each of the positions of icons corresponding to the orientation of the mobile terminal shown in FIG. 3.
Figure 4D:
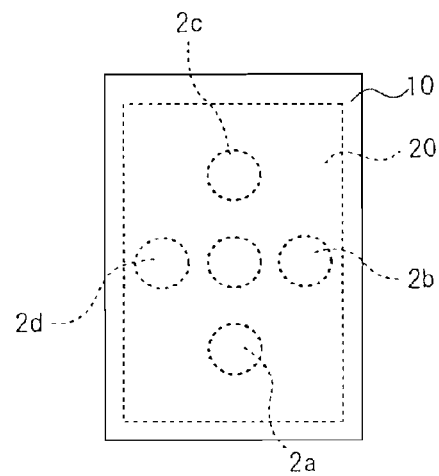
FIG. 4d is a schematic diagram showing the relationship between each of the positions of icons corresponding to the orientation of the mobile terminal shown in FIG. 3.

As shown in FIG. 4a, assuming that the direction, in which touch panel 20 faces obliquely upward and in which icon 2a is placed on the top of touch panel 20, is the reference direction, if mobile terminal 1 is turned upside down, when the user views touch panel 20, as shown in FIG. 4b, icon 2c replaces icon 2a and icon 2d replaces icon 2b. On the other hand, if mobile terminal 1 that faces the reference direction is turned over, when the user watches mobile terminal 1, as shown in FIG. 4c, icon 2d replaces icon 2b. If mobile terminal 1 is turned upside down and turned over, when the user watches mobile terminal 1, as shown in FIG. 4d, icon 2c replaces icon 2a.

Thus, when detection section 30 detects that mobile terminal 1 faces the direction shown in FIG. 4b, control section 50 changes the up, bottom, left, and right in the moving directions of mobile terminal 1 detected by detection section 30 to the bottom, up, right, and left directions, respectively. Specifically, when the moving direction of mobile terminal 1 is the up direction, control section 50 changes the moving direction of mobile terminal 1 to the down direction. When the moving direction of mobile terminal 1 is the 3 o'clock direction, control section 50 changes the moving direction of mobile terminal 1 to the 9 o'clock direction. When the moving direction of mobile terminal 1 is the 9 o'clock direction, control section 50 changes the moving direction of mobile terminal 1 to the 3 o'clock direction. On the other hand, when detection section 30 detects that mobile terminal 1 faces the direction shown in FIG. 4c, control section 50 changes the left and right directions of mobile terminal 1 detected by detection section 30 to the right and left directions, respectively. Specifically, when the moving direction of mobile terminal 1 is the 3 o'clock direction, control section 50 changes the moving direction of mobile terminal 1 to the 9 o'clock direction. When the moving direction of mobile terminal 1 is the 9 o'clock direction, control section 50 changes the moving direction of mobile terminal 1 to the 3 o'clock direction. On the other hand, when detection section 30 detects that mobile terminal 1 faces the direction as shown in FIG. 4d, control section 50 changes the up and down directions of mobile terminal 1 detected by detection section 30 to the down and up directions, respectively. Specifically, when the moving direction of mobile terminal 1 is the up direction, control section 50 changes the moving direction of mobile terminal 1 to the down direction. When the moving direction of mobile terminal 1 is the down direction, control section 50 changes the moving direction of mobile terminal 1 to the up direction.

Vibration section 40 generates vibrations corresponding to the changed moving direction. Control section 50 starts an application corresponding to the changed moving direction. Thus, when the user shakes mobile terminal 1, vibration section 40 generates vibrations corresponding to the selected icon 2a to 2d and control section 50 starts the application corresponding to the changed moving direction. For example, when the user perceives that he or she is holding mobile terminal 1 in the direction shown in FIG. 3 and tries to start the application corresponding to icon 2a, he or she will shake mobile terminal 1 in the up direction. However, when the user is holding mobile terminal 1 in the direction shown in FIG. 4b, since icon 2c is located on the top of mobile terminal 1, control section 50 will start the application corresponding to icon 2c. However, when the moving direction is changed as described above, the moving direction of mobile terminal 1 is changed to the down direction. As a result, vibration section 40 generates vibrations corresponding to icon 2a located at the bottom of mobile terminal 1 and control section 50 starts the application corresponding to icon 2a.

Thus, according to this embodiment, detection section 30 detects the moving direction and orientation of mobile terminal 1, namely not only the change of the posture in the xy directions, but also the orientation in the z direction, generates vibrations corresponding to the moving direction and orientation of mobile terminal 1, and starts an application. As a result, while the user is holding mobile terminal 1, by only shaking it in the direction that he or she desires, he or she can start his or her desired application without need to watch mobile terminal 1.

Second Embodiment

Figure 5A:
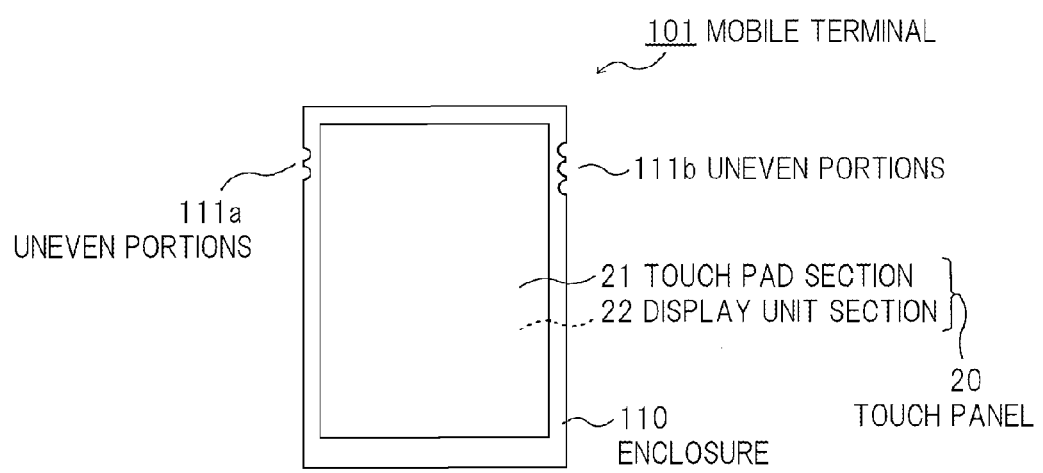
FIG. 5a is an external view showing a mobile terminal according to a second embodiment of the present invention.
Figure 5B:
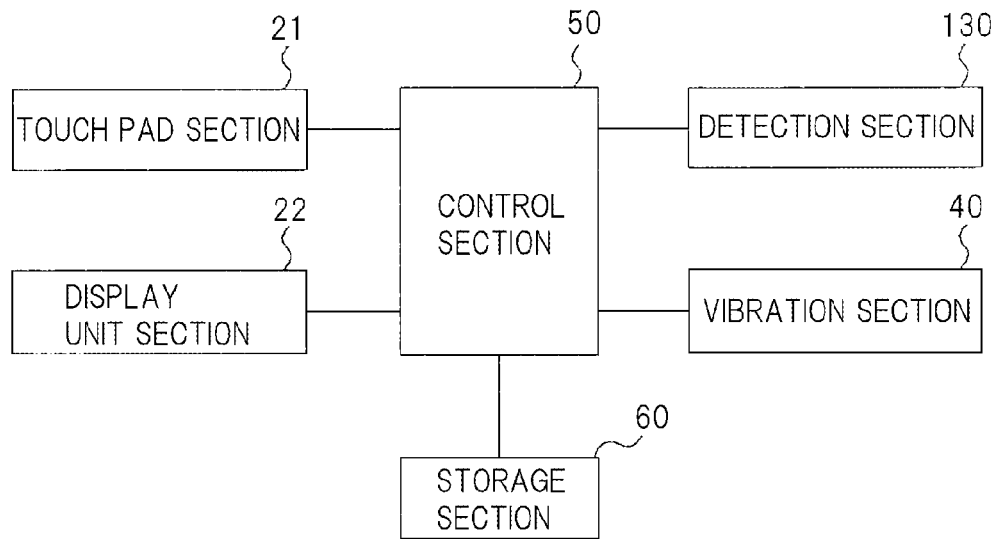
FIG. 5b is a functional block diagram showing the mobile terminal according to the second embodiment of the present invention.

FIG. 5a is an external view showing a mobile terminal according to a second embodiment of the present invention. FIG. 5b is a functional block diagram showing the mobile terminal according to the second embodiment of the present invention.

As shown in FIG. 5a and FIG. 5b, the shape of enclosure 110 is different from that shown in FIG. 1a and FIG. 1b. Enclosure 110 has uneven portions 111a and 111b. The positions of uneven portions 111a and 111b are away from the center of enclosure 110 so that the user who is holding mobile terminal 101 can feel uneven portions 111a and 111b and perceive the orientation of mobile terminal 101.

Next, a control method for mobile terminal 101 having the foregoing structure will be described.

Figure 6:
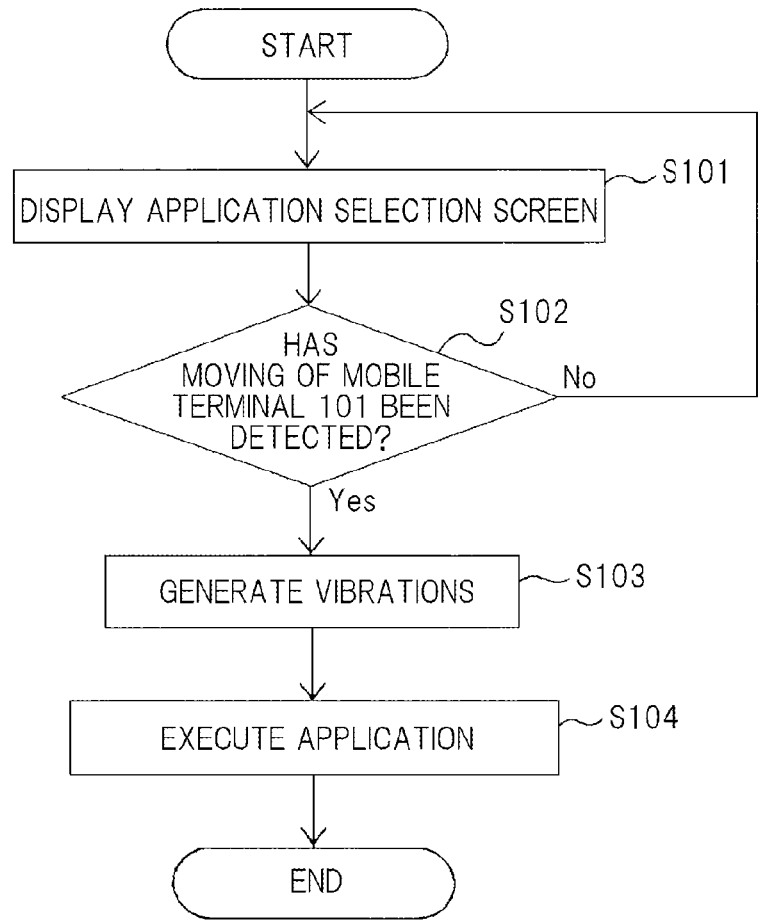
FIG. 6 is a flow chart describing a control method for the mobile terminal shown in FIG. 5a and FIG. 5b.

FIG. 6 is a flow chart describing the control method for mobile terminal 101 shown in FIG. 5a and FIG. 5b.

First, control section 50 causes display unit section 22 to display an application selection screen on touch panel 20 so that the user can select one application from among those that can be executed on mobile terminal 101 shown in FIG. 3 (at step 101).

While the application selection screen is displayed on touch panel 20, when the user shakes mobile terminal 101 in the direction corresponding to the direction that he or she desires to start application, detection section 130 detects that mobile terminal 101 is moving (at step 102) and then vibration section 40 generates vibrations corresponding to the moving direction of mobile terminal 101 detected by detection section 130 (at step 103). Vibration section 40 generates vibrations that differ depending on whether the moving direction of mobile terminal 101 is the up direction represented by icon 2a, the 3 o'clock direction represented by icon 2b, the 6 o'clock direction represented by icon 2c, or the 9 o'clock direction represented by icon 2d.

Thereafter, control section 50 reads from storage section 60 a program that starts the application corresponding to the moving direction of mobile terminal 101 detected by detection section 130 and starts the corresponding application (at step 104). When the moving direction of mobile terminal 101 is the up direction represented by icon 2a, control section 50 starts the application represented by icon 2a. When the moving direction of mobile terminal 101 is the 3 o'clock direction represented by icon 2b, control section 50 starts the application represented by icon 2b. When the moving direction of mobile terminal 101 is the 6 o'clock direction represented by icon 2c, control section 50 starts the application represented by icon 2c. When the moving direction of mobile terminal 101 is the 9 o'clock direction represented by icon 2d, control section 50 starts the application represented by icon 2d.

According to this embodiment, uneven portions 111a and 111b are formed on both lateral sides of enclosure 110. Since the positions of uneven portions 111a and 111b are away from the center portion of enclosure 110, when the user holds mobile terminal 101, he or she can sense and perceive the orientation of mobile terminal 101 with uneven portions 111a and 111b. As a result, the user can perceive the orientation in which he or she is holding mobile terminal 101. Thus, unlike with the mobile terminal according to the first embodiment, control section 50 does not need to change the moving direction of mobile terminal 101 corresponding to the orientation of mobile terminal 101. Instead, according to the second embodiment, the user can change the holding state and shaking direction to start his or her desired application.

The shape of enclosure 110 that allows the user to perceive that the orientation of mobile terminal 101 is not limited to the foregoing uneven portions. For example, the outer shape or pattern of enclosure 101 may be dissymmetrical. The material of the front of enclosure 110 on which touch panel 20 is located may be different from that of the rear thereof. Alternatively, uneven portions may be formed on the front of enclosure 110 where touch panel 20 is located and on the rear thereof. Alternatively, enclosure 110 may be formed in a modified rectangular parallelepiped shape so that the cross sectional shape of mobile terminal 101 becomes trapezoidal.

According to the foregoing two embodiments, an application is started corresponding to the moving direction of mobile terminal 1, 101. Alternatively, as described above, an application corresponding to the moving direction of mobile terminal 1 detected by detection section 30 may be started.

While the application is being executed in the background, the application may be implemented.

Another Embodiment

According to the foregoing embodiments, an application is started corresponding to the moving direction of the mobile terminal. Alternatively, the mobile terminal may be unlocked corresponding to the moving direction of the mobile terminal.

If the mobile terminal has not been operating continuously for a predetermined period of time, the mobile terminal may be locked so as not to display information on the touch panel and so as not to accept at least one process for an input operation to the touch panel.

When the mobile terminal has been locked, if it is shaken in a predetermined direction and movement of the mobile terminal in a predetermined direction is detected, the mobile terminal is unlocked. In this case, vibrations corresponding to the moving direction are generated. The mobile terminal may be unlocked based on how far the mobile terminal has moved in a predetermined direction or based on the acceleration rate at which the mobile terminal is shaken. If the mobile terminal is shaken several times, whenever it is shaken, the moving direction and vector quantity of the mobile terminal are detected. If the moving direction and vector quantity of the mobile terminal match a predetermined pattern, the mobile terminal may be unlocked.

In addition, the shape of the mobile terminal or information displayed on the touch panel may denote the shaking direction in which the mobile terminal is unlocked. Thus, when the user senses or sees the predetermined direction and shakes the mobile terminal corresponding to the unlock pattern of the mobile terminal, he or she can unlock the mobile terminal.

When the mobile terminal is moved successively in a first predetermined direction corresponding to an instruction that unlocks the mobile terminal and in a second predetermined direction corresponding to an instruction that starts a predetermined application, vibration patterns corresponding to these directions may be successively generated.

When the user performs a predetermined operation for the mobile terminal by shaking it in a predetermined direction or moving it, the control section determines whether the mobile terminal is currently locked or unlocked (where the home screen or the like is displayed). When the mobile terminal is currently locked, the control section receives information about movement in the predetermined direction that is detected by the detection section (this information is hereinafter referred to as the first moving information) and issues an unlock instruction as the corresponding function. At this point, the vibration section generates vibrations in the vibration pattern corresponding to the unlock instruction (this pattern is hereinafter referred to as the first vibration pattern). When the mobile terminal is currently locked, if the mobile terminal is moved in any of up, down, left, and right directions in a plane rather than in a restricted direction, for example, the right direction, the unlock instruction may be issued.

After the vibration section generates the vibrations in the first vibration pattern corresponding to the first moving information, before a predetermined period elapses, if the detection section detects that the mobile terminal is moving, the control section determines the moving direction of the mobile terminal. Thereafter, the control section issues a functional instruction that for example starts an application that corresponds to the moving direction of the mobile terminal. The vibration section generates vibration in the vibration pattern that corresponds to the function.

Under the control of the control section, when the user shakes the mobile terminal on its xy coordinate plane, he or she can perceive vibrations that correspond to the first vibration pattern that causes the mobile terminal to be unlocked. After the user perceives the vibrations, when he or she continues to shake the mobile terminal, he or she can issue an instruction that starts a predetermined function or an application that corresponds to the shaking direction and perceive that the instruction has been executed by sensing vibrations in a second vibration pattern.

Thus, the user can issue two instructions as a series of shaking operations to the mobile terminal. In other words, the first instruction serves to unlock the mobile terminal. The second instruction serves to start an application that corresponds to the shaking direction of the mobile terminal. As a result, even if the mobile terminal is currently locked, the user can start a particular application as a single operation.

When the user just wants to unlock the mobile terminal, after he or she perceives vibrations in the first vibration pattern, he or she needs to stop shaking the mobile terminal.

The foregoing predetermined period of time may be changed depending on how long the user needs to take time until he or she decides whether to stop the shaking operation and then really stops it after he or she senses vibrations in the first vibration pattern. As a result, the shaking operation can set as an operation that unlocks the mobile terminal or an operation that starts his or her desired operation that corresponds to his or her favorite timing.

The structural elements of the present invention may be separated based on appropriately specified functions besides those separated based on individual functions represented by the foregoing block diagrams.

According to the present invention, the process performed in the mobile terminal is realized by the foregoing dedicated hardware. Alternatively, the process performed in the mobile terminal may be realized by a program that causes the mobile terminal to perform the function in such a manner that the program is recorded on a record medium that is readable by a computer that becomes a mobile terminal, the mobile terminal is caused to read the program from the record medium, and the program is executed on the mobile terminal. The record medium that is readable by the mobile terminal is a movable record medium such as an IC card, a memory card, a floppy disk (registered trademark), a magneto-optical disc, a DVD, or a CD or the built-in HDD of the mobile terminal. The program recorded on the record medium is read by, for example, a control block. Under the control of the control block, the foregoing process is performed.

The mobile terminal according to the present invention may be a tablet terminal, a smart phone, a mobile phone, a portable music player, a portable game machine, a note PC, a PDA (personal data assistants), a digital camera, a remote controller, or the like.

Part or all of the foregoing embodiments may be described as the following supplements, but not limited thereto.

[Supplement 1]
A mobile terminal, comprising:
detection means that detects an orientation and moving direction of the mobile terminal;
vibration means that generate vibrations corresponding to the orientation and moving direction detected by the detection means; and
control means that executes an operation of the mobile terminal corresponding to the orientation and moving direction detected by the detection means.

[Supplement 2]
The mobile terminal according to supplement 1, further comprising:
display means that displays information that represents an application executed by the mobile terminal,
wherein the control means changes the moving direction detected by the detection means corresponding to the orientation detected by the detection means and executes an application represented by information displayed by the display means, the information being located in the changed moving direction.

[Supplement 3]
A mobile terminal, comprising:
detection means that detects a moving direction of the mobile terminal;
vibration means that generates vibrations corresponding to the moving direction detected by the detection means;
control means that executes an operation of the mobile terminal corresponding to the moving direction detected by the detection means; and
an enclosure that allows an orientation of the mobile terminal to be perceived by touching the mobile terminal.

[Supplement 4]
The mobile terminal according to supplement 3, further comprising:
display means that displays information that represents an application executed by the mobile terminal,
wherein the control means executes an application represented by information displayed by the display means, the information being located in the moving direction detected by the detection means.

[Supplement 5]
The mobile terminal according to any one of supplements 1 to 4,
wherein the control means unlocks the mobile terminal corresponding to the moving direction of the mobile terminal.

[Supplement 6]
A control method for a mobile terminal, comprising:
a detection process that detects an orientation and moving direction of the mobile terminal;
a vibration process that generates vibrations corresponding to the orientation and moving direction detected in the detection process; and
an operation execution process that executes an operation of the mobile terminal corresponding to the orientation and moving direction detected in the detection process.

[Supplement 7]
A program that causes a mobile terminal to execute the procedures, comprising:
a detection procedure that detects an orientation and moving direction of the mobile terminal;
a vibration procedure that generates vibrations corresponding to the orientation and moving direction detected in the detection procedure; and
an operation execution procedure that executes an operation of the mobile terminal corresponding to the orientation and moving direction detected in the detection procedure.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

The present application claims priority based on Japanese Patent Application JP 2012-205699 filed on Sep. 19, 2012, the entire contents of which are incorporated herein by reference in its entirety.

What is claimed is:

1. A mobile terminal comprising:
a detector configured to detect an orientation and moving direction of said mobile terminal;
a vibrator configured to generate vibrations corresponding to the orientation and moving direction detected by said detector;
a controller configured to execute an operation of said mobile terminal corresponding to the orientation and moving direction detected by said detector; and
a display configured to display information that represents an application executed by said mobile terminal,
wherein said controller is further configured to change the moving direction detected by said detector corresponding to the orientation detected by said detector and execute an application represented by information displayed by said display, the information being located in said changed moving direction.

2. The mobile terminal according to claim 1, wherein said controller is further configured to unlock said mobile terminal corresponding to the moving direction of said mobile terminal.

3. A mobile terminal, comprising:
a detector configured to detect a moving direction of said mobile terminal;
a vibrator configured to generate vibrations corresponding to the moving direction detected by said detector;
a controller configured to execute an operation of said mobile terminal corresponding to the moving direction detected by said detector; and
an enclosure comprising uneven portions whose positions are located away from a center of said enclosure.

4. The mobile terminal according to claim 3, further comprising:
a display configured to display information that represents an application executed by said mobile terminal,
wherein said controller is further configured to execute an application represented by information displayed by said display, the information being located in the moving direction detected by said detection.

5. A control method for a mobile terminal, comprising:
a detection process that detects an orientation and moving direction of said mobile terminal;
a vibration process that generates vibrations corresponding to the orientation and moving direction detected in said detection process;
an operation execution process that executes an operation of said mobile terminal corresponding to the orientation and moving direction detected in said detection process;
a display process that displays information that indicates an application executed by said mobile terminal;
a changing process that changes the moving direction detected by said detector corresponding to the orientation detected by said detector; and
an execution process that executes an application indicated by information displayed by said display, the information being located in said changed moving direction.

6. A non-transitory computer readable medium storing a program that causes a mobile terminal to execute the procedures, comprising:
a detection procedure that detects an orientation and moving direction of said mobile terminal;
a vibration procedure that generates vibrations corresponding to the orientation and moving direction detected in said detection procedure; and
an operation execution procedure that executes an operation of said mobile terminal corresponding to the orientation and moving direction detected in said detection procedure;
a display procedure that displays information that indicates an application executed by said mobile terminal;
a changing procedure that changes the moving direction detected by said detector corresponding to the orientation detected by said detector; and
an execution procedure that executes an application indicated by information displayed by said display, the information being located in said changed moving direction.

* * * * *